(12) United States Patent
Woodall (10) Patent No.: US 10,555,004 B1
(45) Date of Patent: Feb. 4, 2020

(54) LOW FREQUENCY COMPENSATED ENCODING

(71) Applicant: PIXELWORKS, INC., Portland, OR (US)

(72) Inventor: Neil Woodall, Newport Beach, CA (US)

(73) Assignee: PIXELWORKS, INC., Portland, OR (US)

( * ) Notice: Subject to any disclaimer, the term of this patent is extended or adjusted under 35 U.S.C. 154(b) by 15 days.

(21) Appl. No.: 15/695,418

(22) Filed: Sep. 22, 2017

(51) Int. Cl.
*H04N 19/89* (2014.01)
*H04N 19/625* (2014.01)
*H04N 19/124* (2014.01)

(52) U.S. Cl.
CPC ......... *H04N 19/625* (2014.11); *H04N 19/124* (2014.11); *H04N 19/89* (2014.11)

(58) Field of Classification Search
CPC ..... H04N 19/625; H04N 19/124; H04N 19/89
See application file for complete search history.

(56) References Cited

U.S. PATENT DOCUMENTS

| | | | |
|---|---|---|---|
| 2004/0005004 A1* | 1/2004 | Demos | H04N 19/147 375/240.08 |
| 2015/0221280 A1* | 8/2015 | Van Der Vleuten | H04N 1/6027 382/167 |
| 2016/0241885 A1* | 8/2016 | Strom | H04N 9/67 |
| 2018/0160126 A1* | 6/2018 | Andersson | H04N 19/186 |
| 2018/0160127 A1* | 6/2018 | Strom | G09G 5/02 |
| 2018/0309995 A1* | 10/2018 | He | H04N 19/126 |
| 2019/0206360 A1* | 7/2019 | Strom | G09G 5/06 |

* cited by examiner

*Primary Examiner* — James T Boylan
(74) *Attorney, Agent, or Firm* — Miller Nash Graham & Dunn LLP (57) ABSTRACT

A method of encoding a non-linear, color space video signal includes converting the non-linear video signal to a linear video signal, transforming the non-linear signal to produce a transformed non-linear signal, transforming the linear signal to product a transformed linear signal, using the transformed linear signal to determine errors, applying the errors to the non-linear, color space video signal to produce a compensated non-linear color space signal, and encoding the compensated signal.

14 Claims, 8 Drawing Sheets

LOW FREQUENCY COMPENSATED ENCODING

BACKGROUND

Lossy digital video encoding works in a non-linear color space. In a non-linear color space, the digital code words are not proportional to the light output. In a linear color space, the digital code words that represent the video signal are proportional to the light output. This requirement arises because a non-linear color space more closely represents how the Human Visual System (HVS) responds to changes in the content and therefore allows more efficient encoding of the signal.

However, the drawback of working in a non-linear color space is that changes to the high frequency content of the picture can change the apparent brightness of the image at lower frequencies. As the compression level of the system increases, these changes to the low frequency content become more and more apparent. If the compression level was constant and the input content did not move, this artifact would not be that important. But as the compression level or the high frequency content changes, the low frequency brightness will change. These changes are seen as unnatural because the changes are not related to other changes in the scene, for example a light source. Furthermore, they are at lower frequencies and easily detected even at further than ideal viewing distances. Therefore, a need exists for an encoding system that allows the non-linear video space to be used for compression while also preventing shifts in the image brightness.

DETAILED DESCRIPTION OF THE EMBODIMENTS

Figure 1:
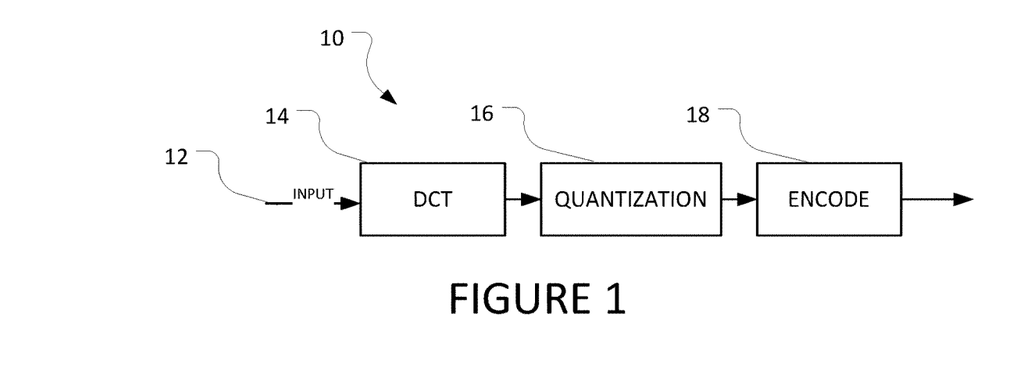
FIG. 1 shows a prior art example of a process of encoding a video signal.

The embodiments here describe a modification to any encoder that either transforms the content to the frequency domain, such as discrete cosine transform (DCT) or Fast Fourier Transform (FFT), or separates high and low frequencies such as wavelet, and then does lossy compression of the signal. FIG. 1 shows a prior art DCT-based encoder, with the understanding that it is just for ease of discussion and to assist with understanding. Implementation of the embodiments here may apply to DCT, FFT or wavelet compression schemes.

In FIG. 1, the prior art system receives an input signal 12. It then transforms the signal to the frequency domain using a DCT transformation at 14. The resulting frequency domain signal is quantized at 16. Quantization generally reduces a range of values to a smaller range of values, reducing the amount of data required. This reduction causes the issues with changes in the lower frequency content. After quantization, the system then encodes the image for transmission at 18. The term 'low frequency' as used here means frequencies lower than the frequency that has been quantized. Most of the issues addressed here are for high frequencies in the range between approximately 70% of the Nyquist frequency to the Nyquist frequency.

Figure 2:
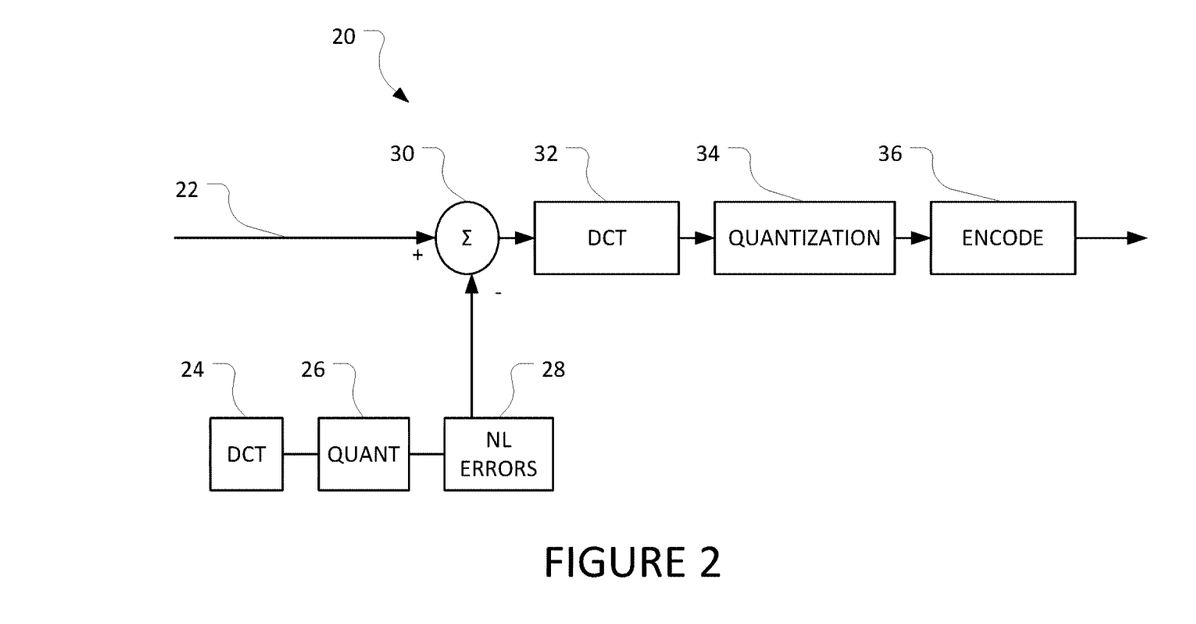
FIG. 2 shows an embodiment of a process of encoding a video signal with low frequency compensation.

Embodiments discussed here mitigate this process by estimating the shift in lower frequencies caused by the lossy compression, then apply a correction to the signal, and then re-do the compression. FIG. 2 shows an overview of an embodiment of this process.

The input signal 22 undergoes the process of FIG. 1, at 24 and 26. The resulting quantized values are then analyzed to determine the non-linear errors at 28. The other path for the input signal is then combined with the errors at 30. This pre-compensates for the quantization errors and adjusts the signal prior to it being transformed at 32, quantized at 34 and then encoded at 36.

Because the compression is still being done in the non-linear domain, it has all the benefits associated with doing the compression in the non-linear domain, but corrects for the artifacts caused by changing the high frequency component amplitudes.

To aid in the understanding of the embodiments, it is first useful to compare the representation of a signal using a non-linear color space vs. a linear color space. The signal under discussion here has a high dynamic range. Dynamic range describes the extremes between how dark an image can get and how bright it can get. A high dynamic range signal has a range much larger than standard dynamic range video signals.

If the non-linear signal represents a high dynamic range (HDR) signal, 10 bits can be used to describe almost all the luma levels that the eye can see from 0 to 10,000 nits. A nit, or nitere (Latin for 'to shine), is a standard unit of luminance equal to a candela per square meter. If a linear color space were to be used, it would require 28 bits worth of data to represent the same range.

The drawback of using a non-linear representation of the signal is that changes to the high frequency content whether caused by scaling, filtering or quantization will not only change the high frequency content, but also lower frequency content. Therefore, while the high frequency content might not even be visible at the distance being viewed, these operations can create artifacts that are visible at larger viewing distances.

Figure 3:
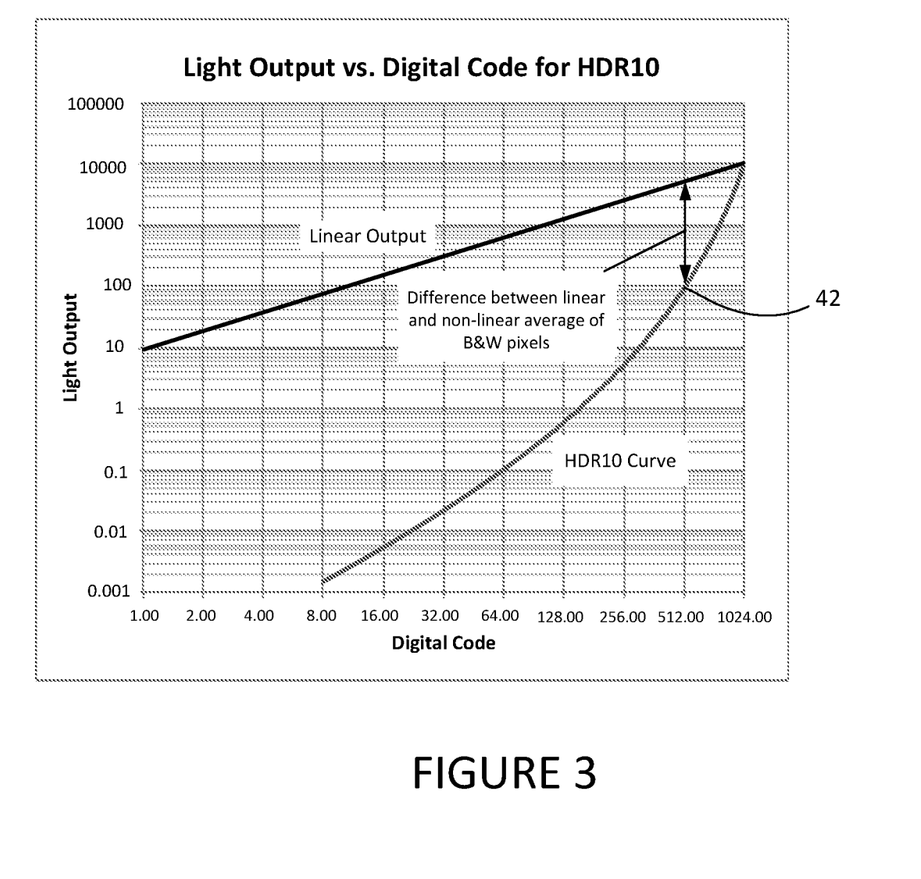
FIG. 3 shows a graph of light output versus digital code for a high dynamic range signal.
Figure 4:
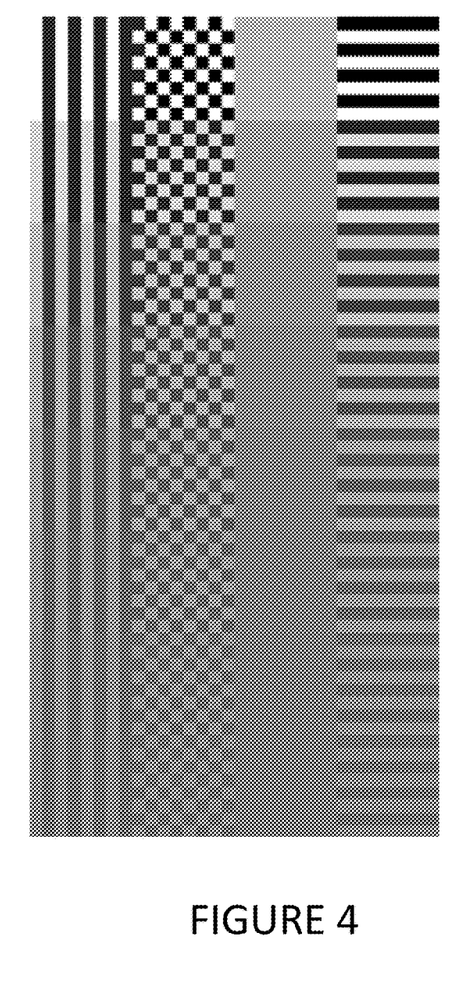
FIGS. 4 and 5 show a pattern with alternating black and white pixels before and after quantization.
Figure 5:
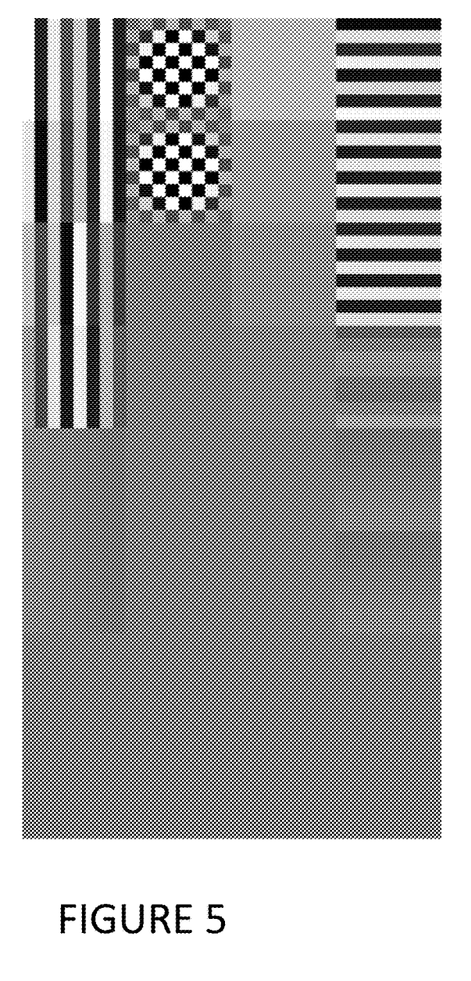

As an example, consider the HDR signal that is in a non-linear color space and the graph of FIG. 3. White, or 10,000 nits is encoded at 1023 while black or zero nits is encoded at 0. If the input is a single dot, such as a star, and the star starts to move, eventually it will cover two pixels and those two pixels will each be at 5,000 nits, shown at line 40 in FIG. 3. If the process were to do the same thing in the digital domain by applying a convolution kernel of [0.5, 0.5] to the input signal, the resultant code values would be 512 and 512. However, 512 represents 98 nits of output light in curve 42, not 5,000 nits. A similar result would happen if an input, such as that shown in FIG. 4 with alternating B&W pixels and was quantized by a lossy compression algorithm. FIG. 5 shows the result. The test pattern is designed to have the same average luma value for each row of 8×8 blocks. As can be seen in FIG. 5 there is significant variation in the lower frequencies from the original image even though most of loss of detail was to the high frequency information.

The basic premise behind most methods of lossy encoding is that the eye is not as sensitive to variations in the high frequency amplitude than for lower frequencies. This reaches the limit when the high frequency content exceeds the ability of the eye to distinguish individual pixels. That is why almost all quantization matrixes increase the quantization step size as the frequency increases. However, as can be seen in the figure above, if the principle is applied to a non-linear color space signal, the impact is spread to lower frequencies that the eye is more sensitive to. An example of a quantization matrix for JPEG encoding is given below. The numbers in the matrix represent the value that the original 8×8 DCT values are divided by. Therefore higher values represent higher levels of quantization.

y_q=

| 16 | 11 | 10 | 16 | 24 | 40 | 51 | 61 |
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

Figure 6:
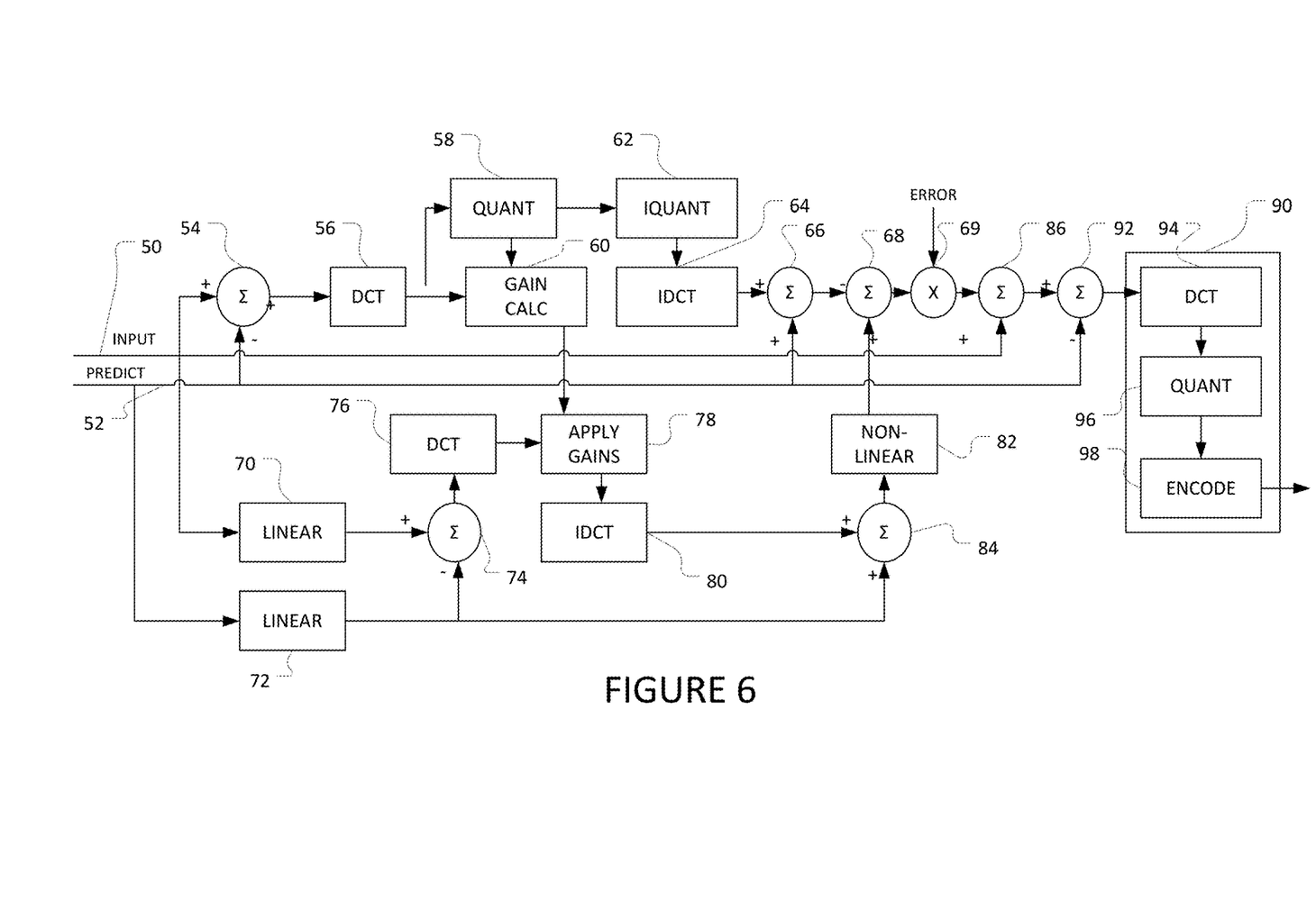
FIG. 6 shows a more detailed embodiment of a process of encoding a video signal with low frequency compensation.

The embodiments here mitigate or eliminate the issues with quantization of non-linear color spaces by estimating the error caused by the process and then adding that error back to the original input signal before doing a second quantization. As can be seen in FIG. 6, the added processes are inserted before any existing method of encoding.

As with almost any video encoder, the process first subtracts any predictions 52 for the current block from the input signal 50 at 54. Similarly, in the lower path, referred to here as the linear path below, the input is buffered in the linear buffer 70 and the prediction is buffered at linear buffered at 72. The prediction in the lower path is then subtracted from the input at 74. One should note that the prediction here is that used in very similar in many current embodiments to get better compression, and should not to be confused with the compensation applied in the embodiments applied here.

In this embodiment, a Discrete Cosine Transform (DCT) then transforms the pixels in the block to the frequency domain at 56. The results of the transform are then quantized at 58 to improve compression efficiency. Sometimes the quantization results in the frequency component amplitude being increased and sometimes it is decreased. Regardless, the change in amplitude can be represented as a gain that is different for each of the frequency components, determined at 60. These gains can be used at to estimate what the quantization needs to be for a linear encoded signal, as a gain function:

$nlGain_{ij}=quantize(nlDCT_{ij})/nlDCT_{ij}$.

The quantize function applied at 58, Round($DCT_{ij}$(floor (S*y_$q_{ij}$+50)/100)), where S represents a scaling factor based on the desired quality level and y_$q_{ij}$ is an entry from the previously presented quantization matrix.

The lower, linear DCT encode path follows the same process as for the non-linear path except for two steps. One, the operations are performed on the linear color space version of the image. This is accomplished by converting the non-linear signals into linear signals at 70 for the input signal and 72 for the prediction, then the prediction is subtracted from the input signal at 74. Two, that instead of doing the quantization step after the DCT step 76, the equivalent gains calculated in the non-linear path are used to adjust the amplitudes of the different frequency components at 78. After the gains are applied, then the Inverse Discrete Cosine Transform (IDCT) is applied at 80 and any prediction is added back to the result at 84. This signal represents the light output that the display should have produced. To adjust the output of the decoder, the result is transformed back to the non-linear domain at 82:

$Adj\_linDCT_{ij}=nlGain_{ij}*linDCT_{ij}$.

Returning to the input path, the process estimates the error of encoding the signal in the non-linear domain, the non-linear result is decoded (IDCT) at 64 and the prediction added back to the IDCT result at 66. Then the result of linear DCT encode path is subtracted from that to produce the error signal at 68. The error signal may be adjusted by an error gain value at 69. The error signal is then added to the input signal at 86. The input has now been pre-compensated and can be encoded for transmission in the final encoding process at 90.

In the final encoding process 90, the pre-compensated signal is treated as the input signal. The prediction is subtracted from the pre-compensated signal at 92. This is then transformed at 94, quantized at 96 and then encoded at 98. The resulting signal does not suffer the same low frequency artifacts that occur in previous encoders.

Figure 7:
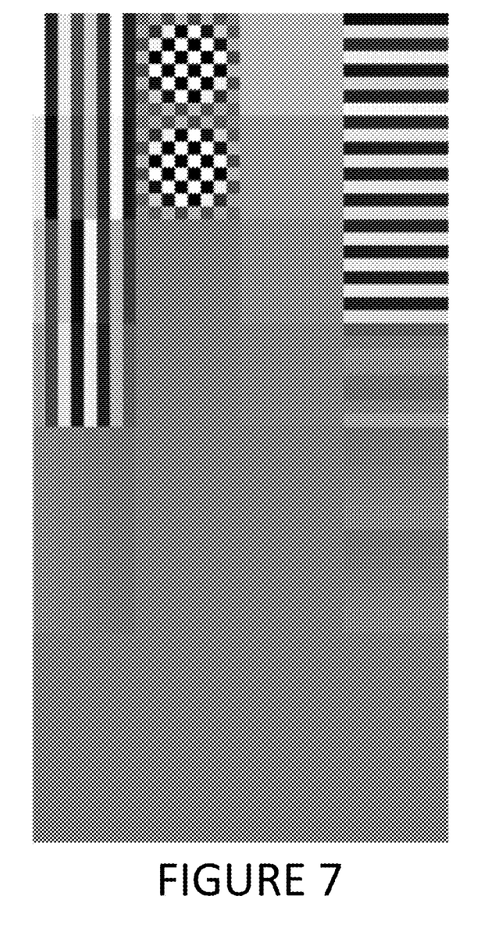
FIG. 7 shows a pattern encoded and decoded with JPEG without the embodiments disclosed here.
Figure 8:
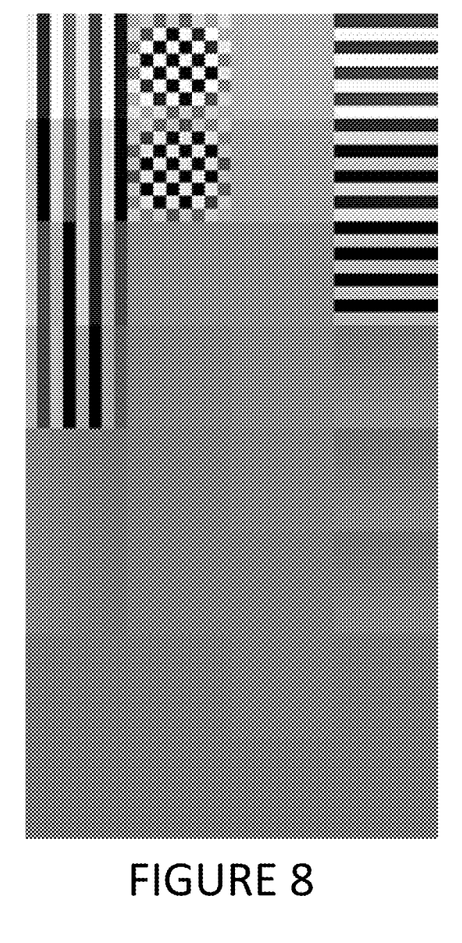
FIG. 8 shows a pattern encoded with the embodiments disclosed here and decoded using standard JPEG.
Figure 9:
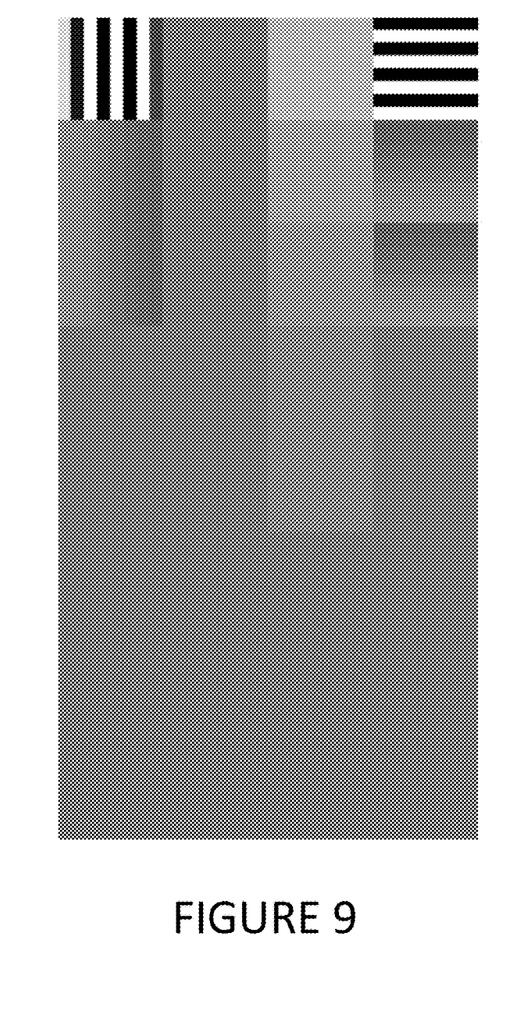
FIG. 9 shows a pattern without the embodiments disclosed here using higher levels of quantization.
Figure 10:
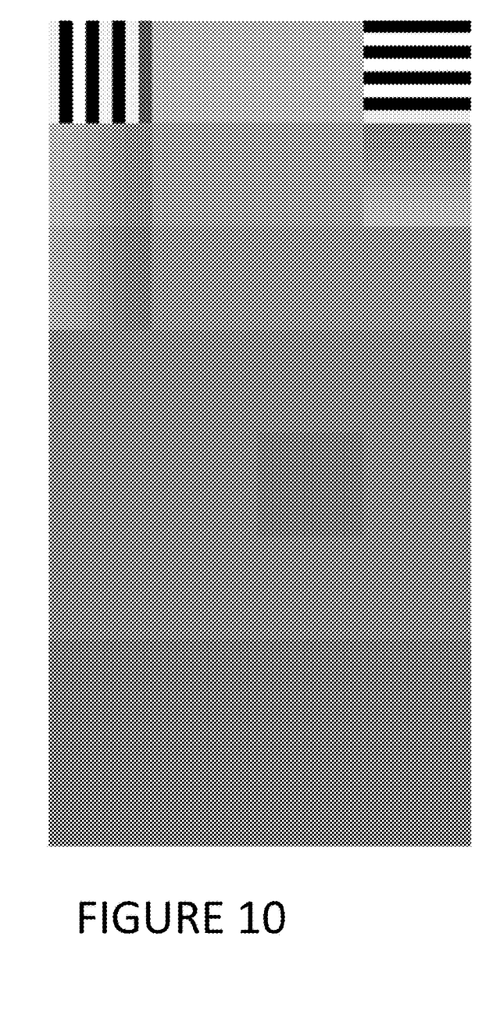
FIG. 10 shows a pattern with the embodiments disclosed here using higher levels of quantization.

If one looks at the normal result for a highly compressed JPEG image one can see that not only is the high frequency content being eliminated by the quantization step, but there is a shift in the overall brightness of a block as was shown in FIG. 5. When the signal is pre-compensated by estimating the errors of encoding in the non-linear domain, the brightness of the blocks in each row are closer in appearance as shown in FIG. 8 for the original image of FIG. 7. Note that the $3^{rd}$ column of blocks in each image represents the correct brightness for the block for the amount of quantization being applied. At even higher levels of quantization, the differences can be dramatic as shown by the original image of FIG. 9 and the quantized version FIG. 10.

The above images were generated using a single pass to estimate the encoding errors. For most applications, this will work well because the higher frequency components that create the largest errors between the linear and non-linear method also have larger quantization steps. The error of interest to the process here is a lower frequency signal with a smaller quantization step. However, it is possible to extend the architecture by applying a gain to the error signal as shown in FIG. 11.

Figure 11:
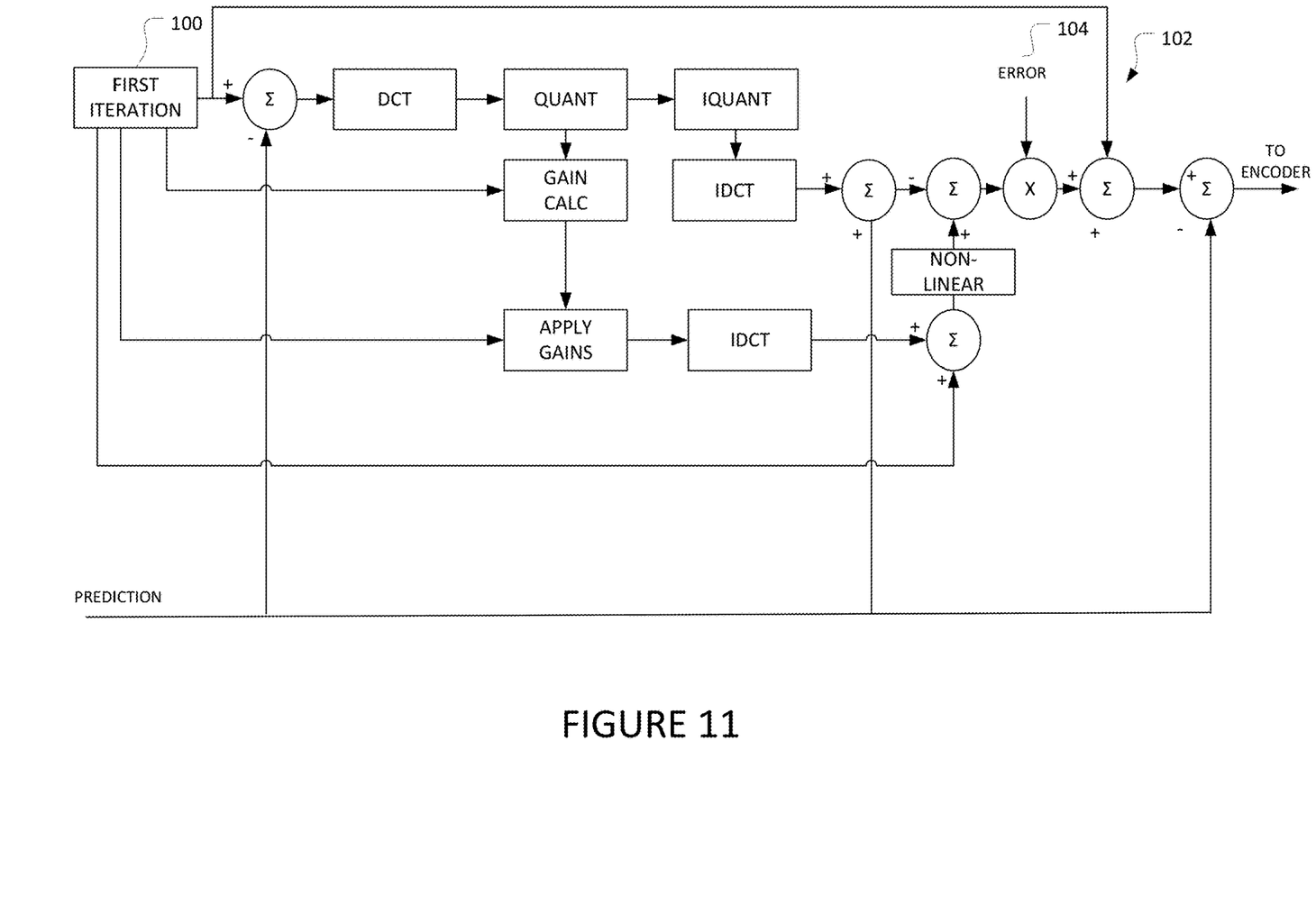
FIG. 11 shows an embodiment of further iterations in which gain is applied to an error signal.

In FIG. 11, the first iteration 100 is the process shown in FIG. 6. In the second iteration 102, the output of the first iteration is used as the input signal for the second iteration. The second iteration is like the first except that that the output of the transform 76 is used, so the lower linear path is much shorter.

By applying a gain of less than one to the error signal at 104 before it is added to the original input it is possible to more slowly converge to the optimum solution. This may result in better results as the initial correction of the non-linear errors may cause the gains that are calculated to change because the quantization stages switch from round up to down, or vis versa.

Figure 12:
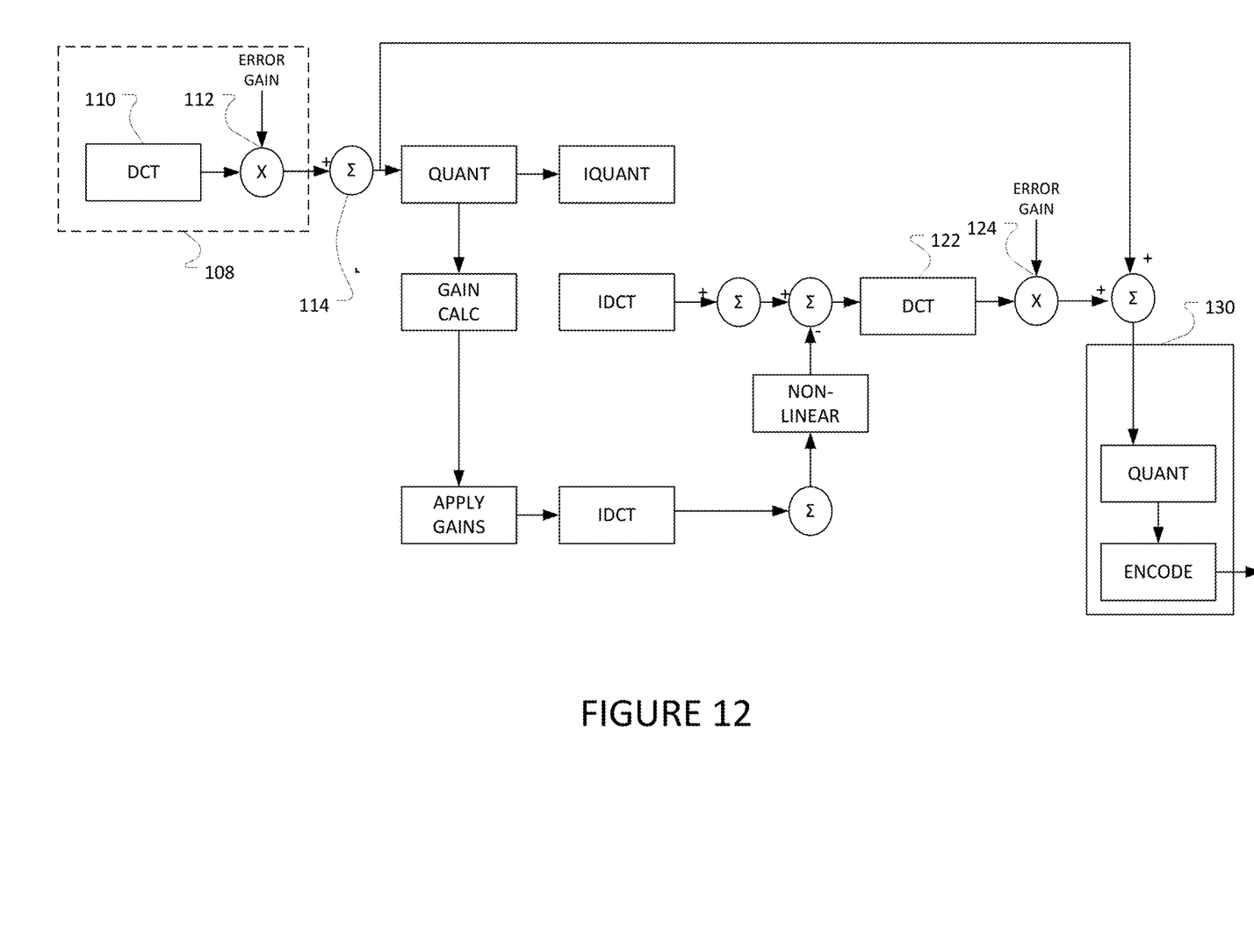
FIG. 12 shows an alternative embodiment of further iterations.

Other methods to allow one or more iterations through the process are possible. For example, as shown in FIG. 12, one could apply the encoding transform to the error signal, apply the error gain to the result and then add that to the original transformed data. In FIG. 12, the 'end' of the first iteration changes 108 to perform the transform 110 on the error signal. The error gain is then applied at 112, and the result is added to the transformed data from 56 in FIG. 6 at 114. The process then continues similar to FIG. 6. At the end of the additional iteration, this same change is applied, as shown by 122 and 124, prior to the final encoding at 130.

This allows different error gains to be applied to different frequencies. The error gain could also be different based on the quantization levels that are applied or the original signals. This would allow the first iteration to correct the errors caused by the highest frequencies in the case of an FFT or DCT transform, or most quantized signals for other method, while at the same time, not allowing those signals to change. Then the next iteration would further prevent the correction to the next highest set of frequencies and so on.

Finally, it should be noted that the choice of the quantization matrix used in a decoder was optimized based on test images being encoded in the non-linear domain and may not be optimal for encoding using this method. Specifically, it may now be better to have larger quantization steps for high frequency components and smaller steps for the low frequency components because the above method prevents changes from the high frequency components that are less visible from causing changes in the low frequency components that are visible.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of encoding a non-linear, color space video signal, comprising:
   converting the non-linear video signal to a linear video signal;
   transforming the non-linear signal to produce a transformed non-linear signal;
   adjusting the transformed non-linear signal to produce an adjusted transformed non-linear signal using a lossy encoding method;
   transforming the linear signal to product a transformed linear signal;
   using a change between the adjusted transformed non-linear signal and the transformed non-linear signal to adjust the transformed linear signal and produce an adjusted transformed linear video signal;
   using the adjusted transformed linear signal and the adjusted transformed non-linear signal to determine errors;
   applying the errors to the non-linear video signal to produce a compensated non-linear video signal;
   encoding the compensated non-linear video signal; and
   displaying an image corresponding to the encoded compensated signal on a display device.

2. The method of claim 1, wherein converting the non-linear signal comprises:
   converting the non-linear color space video signal and a non-linear color space prediction signal to linear color space to produce a linear video signal and a linear prediction signal; and
   subtracting the linear prediction signal from the linear video signal to a signal to be transformed.

3. The method of claim 1, wherein using the transformed non-linear signal to determine errors comprises:
   determining gains to be applied based upon the transformed non-linear signal;
   applying the gains to the transformed linear signal to adjust amplitudes in frequency components to produce an adjusted transformed linear signal;
   inversely transforming the adjusted transformed linear signal to produce a inversely transformed signal; and
   combining the inversely transformed signal with the non-linear signal to produce a pre-compensated signal.

4. The method of claim 3, further comprising adjusting the errors prior to applying the errors to the non-linear, color space video signal.

5. The method of claim 4, wherein the adjusting the errors comprises adjusting the errors based upon the frequency of the errors.

6. The method of claim 1, wherein the determining the errors, using, and applying is performed more than once.

7. The method of claim 6 wherein adjusting the errors comprises different adjustments for different iterations.

8. A method of encoding a non-linear, color space video signal, comprising:
   converting the non-linear video signal to a linear video signal;
   transforming the non-linear video signal to produce a transformed non-linear video signal using a lossy encoding method;
   adjusting the transformed non-linear video signal to produce an adjusted transformed non-linear video signal;
   transforming the linear video signal to produce a transformed linear video signal;
   using a change between the adjusted transformed non-linear video signal and the transformed non-linear video signal to adjust the transformed linear video signal to produce an adjusted transformed linear video signal;
   using the adjusted transformed linear video signal to determine an error signal;
   transforming the error signal to produce a transformed error signal;
   applying error gain to the transformed error signal to product a combined error signal;
   adding the combined error signal to the transformed non-linear video signal to produce a compensated non-linear video signal; and
   encoding the compensated non-linear video signal.

9. The method of claim 8, wherein the using, determining the errors, and applying is performed more than once.

10. The method of claim 8 wherein adjusting the errors is different for different iterations.

11. The method of claim 1, wherein the lossy encoding method includes quantization.

12. The method of claim 1, wherein the transform method comprises one of wavelet, Discrete Cosine Transform, or Fast Fourier Transform.

13. The method of claim 8, wherein the lossy encoding method includes quantization.

14. The method of claim 8, wherein the lossy encoding method comprises one of wavelet, Discrete Cosine Transform, or Fast Fourier Transform.

* * * * *